US007750129B2

(12) United States Patent
Johansson et al.

(10) Patent No.: US 7,750,129 B2
(45) Date of Patent: Jul. 6, 2010

(54) PROCESS FOR THE PURIFICATION OF ANTIBODIES

(75) Inventors: Bo-Lennart Johansson, Uppsala (SE); Hans J. Johansson, Uppsala (SE); Anna Grönberg, Uppsala (SE); Jean-Luc Maloisel, Uppsala (SE); Nicolas Thevenin, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 121 days.

(21) Appl. No.: 10/589,717

(22) PCT Filed: Feb. 25, 2005

(86) PCT No.: PCT/SE2005/000293

§ 371 (c)(1),
(2), (4) Date: Aug. 16, 2006

(87) PCT Pub. No.: WO2005/082483

PCT Pub. Date: Sep. 9, 2005

(65) Prior Publication Data

US 2007/0167613 A1     Jul. 19, 2007

(30) Foreign Application Priority Data

Feb. 27, 2004  (SE)  .................... 0400501
Oct. 21, 2004  (SE)  .................... 0402558

(51) Int. Cl.
*C07K 1/18* (2006.01)
*C07K 1/22* (2006.01)
(52) U.S. Cl. .............. 530/413; 210/660; 210/691; 210/692; 530/515; 530/516
(58) Field of Classification Search ............ None
See application file for complete search history.

(56) References Cited

U.S. PATENT DOCUMENTS

| 4,115,272 | A | * | 9/1978 | Mukhamedyarov et al. .. 210/266 |
| 5,118,796 | A | * | 6/1992 | Prior et al. ............ 530/388.1 |
| 5,151,350 | A | | 9/1992 | Colbert et al. |
| 5,429,746 | A | | 7/1995 | Shadle et al. |
| 5,861,475 | A | * | 1/1999 | Cooper, Jr. ................ 530/300 |
| 6,440,933 | B1 | * | 8/2002 | Bodor et al. ................ 514/11 |
| 6,498,236 | B1 | | 12/2002 | Lihme et al. |
| 6,702,943 | B1 | | 3/2004 | Johansson et al. |
| 6,734,294 | B2 | * | 5/2004 | Nelson et al. ............ 536/22.1 |
| 6,852,230 | B2 | * | 2/2005 | Belew et al. ............... 210/635 |
| 2002/0110495 | A1 | * | 8/2002 | Hunt et al. ................ 422/101 |
| 2002/0187144 | A1 | * | 12/2002 | Welt et al. ................ 424/142.1 |

FOREIGN PATENT DOCUMENTS

| WO | WO 84/00773 | | 3/1984 |
| WO | WO 97/10887 | | 3/1997 |
| WO | WO 02/05959 | | 1/2002 |
| WO | WO 02/053288 | * | 7/2002 |
| WO | WO 03/024588 | | 3/2003 |

OTHER PUBLICATIONS

Arshady, R., "Styrene Based Polymer Supports Developed by Suspension Polymerization", *La Chimica e L'Industria*, vol. 70, No. 9, 1988, p. 70-75.
Blank, G., et al., "Expanded Bed Adsorption in the Purification of Monoclonal Antibodies: A Comparison of Process Alternatives", *Bioseparation*, vol. 10, 2001, p. 65-71.
Burton, S., et al., "Salt-Independent Adsorption Chromatography: New Broad-Spectrum Affinity Methods for Protein Capture", *Journal of Biochemical and Biophysical Methods*, vol. 49, 2001, p. 275-287.
Hansen, M., et al., "Capture of Human Fab Fragments by Expanded Bed Adsorption with a Mixed Mode Adsorbent", *Bioseparation*, vol. 8, 1999, p. 189-193.
Johansson, B., et al., "Preparation and Characterization of Prototypes for Multi-Modal Separation Aimed for Capture of Positively Charged Biomolecules at High-Salt Conditions", *Journal of Chromatography A*, vol. 1016, 2003, p. 35-49.
Kastner, M., "Protein Liquid Chromatography", *Journal of Chromatography Library*, vol. 61, 2000, p. 61.
Nau, D., "Chromatographic Method for the Purification of Therapeutic-Grade Monoclonal Antibodies", *JTBaker.com Technical Library*, 2000, Mallinckrodt Baker, Inc., http://www.jtbaker.com/techlib/documents/8013.html.
Hjerten, S., "The Preparation of Agarose Spheres for Chromatography of Molecules and Particles", *Biochim. Biophys. Acta*, vol. 79, No. 2, 1964, p. 393-398.
Karger, B., et al., "An Introduction to Separation Science" John Wiley and Sons, 1973, p. 42.

\* cited by examiner

*Primary Examiner*—David A Saunders
(74) *Attorney, Agent, or Firm*—Yonggang Ji

(57) ABSTRACT

The present invention relates to a process for the purification of antibodies from one or more impurities in a liquid, which process comprises contacting said liquid with a first chromatography resin comprised of a support to which multi-modal ligands have been immobilised to adsorb the antibodies to the resin, wherein each multi-modal ligand comprises at least one cation-exchanging group and at least one aromatic or heteroaromatic ring system; adding an eluent to release the antibodies from the resin; and contacting the eluate so obtained with a second chromatography resin. In one embodiment, the ring-forming atoms of the aromatic or heteroaromatic entity are selected from the group consisting of C, S and O, and the cation exchanging group is a weak cation exchanger.

11 Claims, 5 Drawing Sheets

PROCESS FOR THE PURIFICATION OF ANTIBODIES

CROSS REFERENCE TO RELATED APPLICATIONS

This application is a filing under 35 U.S.C. §371 and claims priority to international patent application number PCT/SE2005/000293 filed Feb. 25, 2005, published on Sep. 9, 2005, as WO 2005/082483, which claims priority to patent application number 0400501-3 filed in Sweden on Feb. 27, 2004 and 0402558-1 filed in Sweden on Oct. 21, 2004; the disclosures of which are incorporated herein by reference in their entireties.

FIELD OF THE INVENTION

The present invention relates to a process for the purification of antibodies, such as monoclonal antibodies. More specifically, the present invention relates to a method for capture of antibodies; a process for purification of antibodies using at least two chromatographic steps; a kit for purification of antibodies using the method of the invention; and a chromatography column.

BACKGROUND OF THE INVENTION

The immune system is composed of many interdependent cell types that collectively protect the body from bacterial, parasitic, fungal, viral infections and from the growth of tumour cells. The guards of the immune system are macrophages that continually roam the bloodstream of their host. When challenged by infection or immunisation, macrophages respond by engulfing invaders marked with foreign molecules known as antigens. This event, mediated by helper T cells, sets forth a complicated chain of responses that result in the stimulation of B-cells. These B-cells, in turn, produce proteins called antibodies, which bind to the foreign invader. The binding event between antibody and antigen marks the foreign invader for destruction via phagocytosis or activation of the complement system. A number of different classes of antibodies, or immunoglobulins, exist, such as IgA, IgD, IgE, IgG, and IgM. They differ not only in their physiological roles but also in their structures. From a structural point of view, IgG antibodies are a particular class of immunoglobulins that have been extensively studied, perhaps because of the dominant role they play in a mature immune response.

The biological activity, which the immunoglobulins possess, is today exploited in a range of different applications in the human and veterinary diagnostic, health care and therapeutic sector. In fact, in the last few years, monoclonal antibodies and recombinant antibody constructs have become the largest class of proteins currently investigated in clinical trials and receiving FDA approval as therapeutics and diagnostics. Complementary to expression systems and production strategies, purification protocols are designed to obtain highly pure antibodies in a simple and cost-efficient manner.

Traditional methods for isolation of immunoglobulins are based on selective reversible precipitation of the protein fraction comprising the immunoglobulins while leaving other groups of proteins in solution. Typical precipitation agents are ethanol, polyethylene glycol, lyotropic salts such as ammonium sulphate and potassium phosphate, and caprylic acid. Typically, these precipitation methods are giving very impure products while at the same time being time consuming and laborious. Furthermore, the addition of the precipitating agent to the raw material makes it difficult to use the supernatant for other purposes and creates a disposal problem, which is particularly relevant when speaking of large-scale purification of immunoglobulins.

An alternative method for isolation of immunoglobulins is chromatography, which embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions many times before the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in the order of increasing interaction with the stationary phase. The least retarded component elutes first, the most strongly retained material elutes last. Separation is obtained when one component is retarded sufficiently to prevent overlap with the zone of an adjacent solute as sample components elute from the column. Efforts are continuously being made to design the optimal stationary phase for each specific separation purpose. Such a stationary phase is commonly comprised of a support or base matrix to which a ligand comprising functional i.e. binding groups has been attached. Reference is commonly made to each kind of chromatography based on the principle of interaction utilised. Industrial chromatography processes often involve more than one step, starting with a capture step, which is the initial purification of the target molecule from either crude or clarified feed; followed by an intermediate purification step and a final polishing step.

Ion exchange chromatography is frequently used for isolation of immunoglobulins. In anion exchange chromatography, negatively charged amino acid side chains of the immunoglobulin will interact with positively charged ligands of a chromatography matrix. In cation exchange chromatography on the other hand, positively charged amino acid side chains of the immunoglobulin will interact with negatively charged ligands of a chromatography matrix.

Hydrophobic interaction chromatography (HIC) is also a method widely described for isolation of immunoglobulins. However, hydrophobic matrices require an addition of lyotropic salts to the raw material to make the immunoglobulin bind efficiently. The bound antibody is released from the matrix by lowering the concentration of lyotropic salt in a continuous or stepwise gradient. If a highly pure product is the object, it is recommended to combine the hydrophobic chromatography with a further step. A disadvantage of this procedure is the necessity to add lyotropic salt to the raw material as this gives problems and thereby increased cost to the large-scale user. For other raw materials than cell culture supernatants such as whey, plasma, and egg yolk the addition of lyotropic salts to the raw materials would in many instances be prohibitive in large-scale applications as the salt could prevent any economically feasible use of the immunoglobulin depleted raw material. An additional problem in large-scale applications would be the disposal of several thousand litres of waste.

Protein A and Protein G affinity chromatography are popular and widespread methods for isolation and purification of immunoglobulins, particularly for isolation of monoclonal antibodies, mainly due to the ease of use and the high purity obtained. Used in combination with ion exchange, hydrophobic interaction, hydroxyapatite and/or gel filtration steps, especially protein A-based methods have become the antibody capture method of choice for many biopharmaceutical companies, see e.g. WO 84/00773 and U.S. Pat. No. 5,151,350.

It has been suggested to combine Protein A chromatography with hydrophobic interaction chromatography (HIC). U.S. Pat. No. 5,429,746 (SmithKline Beecham Corp.) relates to the application of hydrophobic interaction chromatography as one step in the purification of antibodies. It is disclosed therein how HIC can be used following affinity chromatography employing e.g. Protein A, optionally with an intermediate cation exchange chromatography step. The cation exchange chromatography is illustrated by a weak cation exchanger (CM Sepharose™ FF), which is adjusted to pH 5.5 for adsorption and eluted with an elution buffer of 40 mM citrate, 100 mM sodium chloride, pH 6. The mixture applied to the HIC column, following affinity and/or cation exchange chromatography, may then contain impurities such as immunoglobulin aggregates, misfolded species, host cell protein and residue material from the affinity chromatography step. In such a process, antibody is first adsorbed to a Protein A chromatographic support and eluted; then adsorbed to the cation exchange chromatographic support and selectively eluted there from; and finally adsorbed to a HIC support and eluted.

As an alternative to protein-based affinity columns, purely chemical resins, such as multi-modal resins wherein different but co-operative sites interact with a target, have been suggested for antibody purification. One commercially available example is the MBI Hypercel® (BioSepra), an adsorbent which comprises mercapto-benzimidazole-sulphonic acid ligands and is stated to provide hydrophobic as well as ionic interactions with antibodies. The hydrophobic interactions are assumed to be due to the aromatic ring system, while the ionic interactions should be due to the $SO_3^-$ substituent, which is known as a strong cation exchanger. In addition, the nitrogen atoms of the aromatic system of the MBI ligand are chargeable under certain conditions, and can consequently provide ionic interactions with negatively charged groups.

U.S. Pat. No. 6,498,236 (Upfront Chromatography) discloses a method for the isolation or purification of immunoglobulins from a solution, such as a hybridoma cell culture supernatant, animal plasma or sera. The method is suggested as an alternative to the use of Protein A, Protein G, synthetic peptides and other relatively high molecular weight ligands, which are stated to involve drawbacks due to the small difference between the respective molecular weights of the ligands and the immunoglobulins, as well as to their natural tendency to bind to each other. According to U.S. Pat. No. 6,498,236, the nature of the substituents present on their ligands, such as benzene rings, is decisive for an efficient binding the immunoglobulins efficiently. More specifically, the solid phase matrices used in the disclosed method are described by the formula M-SP1-X-A-SP2-ACID, wherein M designates the matrix backbone, SP1 designates a spacer, X designates O, S or NH, A designates a mono- or bicyclic optionally substituted aromatic or heteroaromatic moiety, SP2 designates an optional spacer and ACID designates an acidic group. The ligand is preferably derived from compounds selected from the group consisting of benzimidazoles, benzothiazoles, and benzoxazoles.

WO 97/10887 (Novo Nordisk A/S) relates to conjugates of affinity ligand-matrix useful in the purification of proteinaceous materials such as immunoglobulins, insulins, Factor VII or human growth hormone or analogues, derivatives and fragments thereof. The WO 97/10887 invention is based on the notion that the selectivity of hydrophobic ligands may be increased by increasing the complexity and spatial geometry of the hydrophobic component. This notion led to the discovery of a generic group of affinity ligands, which group is limited to structures having a heteroaromatic entity wherein at least one ring-forming atom is nitrogen.

Further, a method of synthesising multi-modal cationic exchanger media is disclosed in WO 03/024588 (Amersham Biosciences, Uppsala, Sweden). More specifically, a scaffold comprising two functionalities, preferably homocysteine thiolactone, is derivatised and reacted with a solid base matrix. More specifically, one of the two functionalities, preferably sulphur, is used for the coupling to the matrix and the second functionality is one that can be transformed into an ionic group. Thus, the multi-modal media so produced will be capable of ionic interaction as well as a further kind of interaction, such as hydrophobic interaction, depending on the nature of the derivatisation. In the experimental part, the produced cation exchangers are tested using three model proteins, namely Cytochrome C (Cyt C), bovine serum albumin (BSA) and immunoglobulin G (IgG).

BRIEF DESCRIPTION OF THE INVENTION

In one aspect, the present invention provides a robust process for the purification of antibodies. This can be achieved by contacting a liquid comprising the antibodies with a first chromatography resin comprised of a support to which multi-modal ligands have been immobilised, eluting the antibodies by releasing them from the resin and contacting the eluate with a second chromatography resin, as defined in detail in the appended claims.

In a further aspect, the invention provides purification of antibodies from smaller volumes of feed than prior art methods. More specifically, the invention provides capture of antibodies from a process feed without the need of dilution of the salt concentration in process feed. This can be achieved by a process as described above, wherein the multi-modal ligands are salt tolerant ligands known as "high salt ligands". Such a first step is optionally followed by a second chromatography step using a chromatography resin comprised of a support to which multi-modal ligands comprising anion-exchanging groups have been immobilised.

In a specific aspect, the invention provides a process wherein the second chromatography step is performed under non-binding conditions.

Other aspects and advantages of the present invention will appear from the detailed disclosure that follows.

DEFINITIONS

Figure 1:
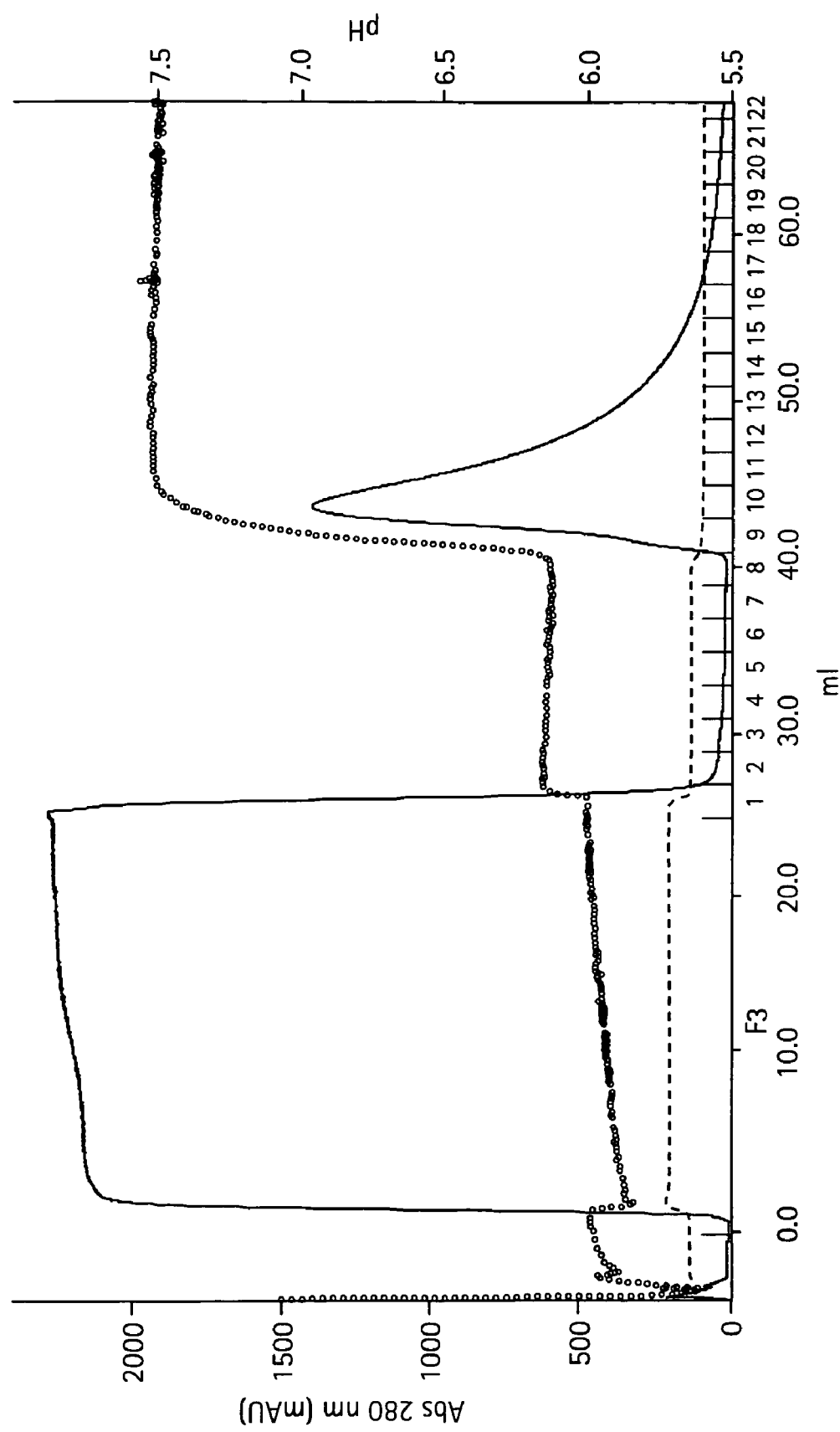
FIG. 1 shows a chromatogram from purification of feed containing IgG on a multi-modal cation exchange chromatography media.

The terms "antibody" and "immunoglobulin" are used interchangeably in the present specification.

The term "eluent" is used in its conventional meaning in this field, i.e. a buffer of suitable pH and/or ionic strength to release one or more compounds from a separation matrix.

The term "affinity chromatography" means chromatography based on specific interactions between a target biomolecule and a biospecific ligand in a principle of lock-key recognition. Thus, the target and ligand will constitute an affinity pair, such as antigen/antibody, enzyme/receptor etc.

The term "aromatic" group refers to a group defined according to Huckel's rule by the formula (4n+2), wherein n is a positive integer or zero.

The term "chromatography resin" is used herein to denote a support to which functional groups, known as ligands, have been coupled. The term "matrix" is sometimes used to denote the support.

The term "multi-modal chromatography ligand" refers to a ligand that is capable of providing at least two different, but co-operative, sites which interact with the substance to be bound. One of these sites gives an attractive type of charge-charge interaction between the ligand and the substance of interest. The other site typically gives electron acceptor-donor interaction and/or hydrophobic and/or hydrophilic interactions. Electron donor-acceptor interactions include interactions such as hydrogen-bonding, $\pi$-$\pi$, cation-$\pi$, charge transfer, dipole-dipole, induced dipole etc. The multi-modal chromatography ligands are also known as "mixed mode" chromatography ligands. In the present application, a chromatography resin, wherein the ligands are multi-modal ligands in which the charge-charge interacting group is negatively charged will be denoted "multimodal cation-exchange resin", while a chromatography resin, wherein the ligands are multi-modal ligands in which the charge-charge interacting group is positively charged will be denoted "multimodal anion-exchange resin".

The phrase "electron donor-acceptor interactions" means that an electronegative atom with a free pair of electrons acts as a donor and bind to an electron-deficient atom that acts as an acceptor for the electron pair of the donor. (See e.g. Karger et al., An Introduction into Separation Science, John Wiley & Sons (1973) page 42.)

The term "cation exchanging group" means herein a group which is negatively charged or chargeable.

The term "capture step" refers in the context of liquid chromatography to the initial step of a separation procedure. Most commonly, a capture step includes clarification, concentration, stabilisation and a significant purification from soluble impurities. After the capture step, an intermediate purification may follow, which further reduces remaining amounts of impurities such as host cell proteins, DNA, viruses, endotoxins, nutrients, components of a cell culture medium, such as antifoam agents and antibiotics, and product-related impurities, such as aggregates, misfolded species and aggregates.

The term "polishing step" refers in the context of liquid chromatography to a final purification step, wherein trace impurities are removed to leave an active, safe product. Impurities removed during the polishing step are often conformers of the target molecule or suspected leakage products.

The term an "Fc-binding protein" means a protein capable of binding to the crystallisable part (Fc) of an antibody and includes e.g. Protein A and Protein G, or any fragment or fusion protein thereof that has maintained said binding property.

DETAILED DESCRIPTION OF THE INVENTION

The present invention relates to a method for capture of one or more antibodies from a liquid, which method comprises contacting said liquid with a chromatography resin comprised of a support to which multi-modal ligands have been immobilised to adsorb the antibodies to the resin, wherein each multi-modal ligand comprises at least one cation-exchanging group and at least one aromatic or heteroaromatic ring system, in which system the ring-forming atoms are selected from the group consisting of carbon (C), sulphur (S) and oxygen (O) atoms.

In an advantageous embodiment of the present method, the ring-forming atoms are selected from the group consisting of carbon (C) and sulphur (S) atoms. In a specific embodiment, the ring-forming atoms are carbon (C) atoms. The present method may be used on a fermentation liquid, which has preferably been clarified e.g. by filtration to remove cell debris and the like. Most commonly, in capture mode, there has been no preceding chromatography. In order to obtain a product of higher purity, the present method is preferably followed by further purification, such as by chromatography, membrane filtration or any other conventional purification method. Thus, in one embodiment, the multi-modal chromatography capture step is followed by one or further purification steps.

In one aspect, the present invention relates to a process for the purification of one or more antibodies from a liquid, which process comprises contacting said liquid with a first chromatography resin comprised of a support to which multi-modal ligands have been immobilised to adsorb the antibodies to the resin, wherein each multi-modal ligand comprises at least one cation-exchanging group and at least one aromatic or heteroaromatic ring system; adding an eluent to release the antibodies from the resin; and contacting the eluate so obtained with a second chromatography resin.

Thus, in a first step, which is a capture step, a liquid that comprises the antibodies is contacted with the multi-modal chromatography resin under binding conditions, allowing the antibodies and optionally one or more impurities to adsorb. The liquid contacted with the first resin is advantageously buffered at a pH below the isoelectric point of the desired antibody. After the adsorption step, another liquid known as an eluent will be contacted with the resin to desorb i.e. release the antibodies. The eluent is commonly a buffer, such as phosphate buffer. In one embodiment, the elution is a step elution by increase of pH. However, it is understood that the skilled person in this field can easily adapt the conditions to obtain adsorption and elution, e.g. by other adjustment of the pH and/or the salt concentration, i.e. the conductivity of the solution. In an advantageous embodiment, the first step of the present process is passing a liquid and/or eluent over a packed chromatography column e.g. by gravity or pumping. If required, one or more washing steps may be applied between the chromatography steps of the present process. The liquid applied to the first step is advantageously a feed stream, i.e. a cell culture liquid or a fermentation broth, which has optionally been subjected to pre-treatment such as filtration, conditioning by adjustment of pH and/or conductivity etc. Thus, the first chromatography capture step will remove host cell residues such as cell debris and proteins, DNA, endotoxins, and the like. An advantage of using the present process directly on a process feed is that the specific multi-modal ligands used herein are capable of adsorbing antibodies at higher salt concentrations than conventional resins, which thus greatly reduces or even eliminates the need to dilute the process feed which, as is well known, will be of relatively high conductivity. The reduction in process volumes will improve the process efficiency and avoids investment in very large and costly equipment. In a specific embodiment, the present process is run as an expanded bed process.

The multi-modal chromatography resin used in the present process is easily prepared by the skilled person in this field. In brief, the resin is comprised of multi-modal ligands coupled to an organic or inorganic support sometimes denoted a base matrix, directly or via a spacer. The support may be in the form of particles, such as essentially spherical particles, a monolith, filter, membrane, surface, capillaries, etc. In one embodiment, the support is prepared from a native polymer, such as cross-linked carbohydrate material, such as agarose, agar, cellulose, dextran, chitosan, konjac, carrageenan, gellan, alginate etc. To obtain high adsorption capacities, the support is preferably porous, and ligands are then coupled to the external surfaces as well as to the pore surfaces. Such native polymer supports are easily prepared according to standard methods, such as inverse suspension gelation (S Hjertén: Biochim Biophys Acta 79(2), 393-398 (1964). Alternatively, the support is prepared from a synthetic polymer, such as cross-linked synthetic polymers, e.g. styrene or styrene derivatives, divinylbenzene, acrylamides, acrylate esters, methacrylate esters, vinyl esters, vinyl amides etc. Such synthetic polymers are easily produced according to standard methods, see e.g. "Styrene based polymer supports developed by suspension polymerization" (R Arshady: Chimica e L'Industria 70(9), 70-75 (1988)). Porous native or synthetic polymer supports are also available from commercial sources, such as Amersham Biosciences, Uppsala, Sweden. A specific example of a resin useful for antibody purification with multi-modal ligands is a resin for expanded bed adsorption, i.e. a polymer support containing high density fillers, preferably stainless steel fillers.

As mentioned above, the multi-modal ligands of the chromatography resin utilised in the present process comprise at least one cation-exchanging group and at least one aromatic or heteroaromatic ring system. In an alternative embodiment, the resin used in the first step is multi-modal and comprised of two different kinds of ligands namely cation-exchanging groups and aromatic or heteroaromatic ring systems, preferably in substantially equivalent amounts. The aromatic ring system, which is capable of hydrophobic interactions with a target molecule, may be comprised of one or two cyclic structures, either separated by one or more atoms or e.g. as a naphtyl group. Further, the ring system is optionally substituted, e.g. with alkyloxy groups, such as methoxy groups. In one embodiment, the aromatic or heteroaromatic ring system does not contain any nitrogen atoms but is limited to carbon atom(s), sulphur atom(s) and/or oxygen atom(s) as constituting atoms of the cyclic structure. Consequently, in this embodiment, the first step contact is with a multimodal cation-exchanger comprising an aromatic or heteroaromatic ring system with no nitrogen in the ring-forming positions. Thus, in one embodiment, the ring-forming atoms of the aromatic or heteroaromatic entity are selected from the group consisting of carbon (C), sulphur (S) and oxygen (O) atoms. In an advantageous embodiment, the ring-forming atoms of the aromatic or heteroaromatic entity are selected from the group consisting of carbon (C) and sulphur (S). In a specific embodiment, the ring-forming atoms of the aromatic or heteroaromatic entity are carbon (C) atoms.

In one embodiment, the resin used in the first step of the present process is described as follows:

Sup-spacer-X-cation exchange group—spacer—aromatic or heteroaromatic ring, wherein Sup is a support, the spacers are optional; and X is a coupling atom such as O, S or N. Suitable spacers and coupling chemistries resulting in such spacers are well known in this field. Accordingly, this embodiment differs from the above discussed U.S. Pat. No. 6,498,236, wherein the acidic group that acts as a cation exchange group is a substituent to an aromatic entity. Thus, the resin used in the present embodiment can be expected to allow a different and more spatially extended kind of bond to the target compounds, since the structure allows a further distance between aromatic and cationic functions.

The cation-exchanging group is preferably a weak cation exchanger, i.e. a group which can be protonated at certain pH values. Contrary to weak cation exchangers, strong cation exchange groups comprise groups that maintain charge at all pH values. Thus, in one embodiment, the multi-modal ligands comprise carboxylic groups, such as one or two carboxylic groups.

However, as the skilled person in this field will understand, multi-modal ligands as described above may in addition provide further interactions, such as hydrogen bonding. In addition to the above discussed groups, the multi-modal chromatography ligands used in the present process may also comprise one or more sulphonyl groups, amines or carbonyl groups, which may or may not contribute to the interactions with the impurities and antibody, respectively.

The ligands that are coupled to the above discussed carriers to prepare the multi-modal chromatography resin as used in the present process can e.g. be synthesised as described in the above discussed WO 03/024588 (Amersham Biosciences, Uppsala, Sweden), wherein multi-modal ligands comprising weak cationic functions are synthesised starting from homocysteine thiolactone. For further references to the synthesis of multi-modal ligands, see e.g. WO 02/059059 (Amersham Biosciences, Uppsala, Sweden). The ligands may be coupled to the carriers via suitable distancing elements known as spacers. For a review of coupling methods useful to this end, see e.g. Immobilized Affinity Ligand Techniques, Hermanson et al, Greg T. Hermanson, A. Krishna Mallia and Paul K. Smith, Academic Press, INC, 1992. As is well known in this field, parameters such as ligand density or substitution level, pore size of the support etc may be varied to provide a chromatography resin having desired properties.

The second step of the present process involves contacting the eluate obtained from the first step with a second chromatography resin. In one embodiment, the second chromatography step is selected from the group that consists of ion exchange chromatography; hydrophobic interaction chromatography (HIC); immobilised metal affinity chromatography (IMAC); and affinity chromatography. All of said methods and their use are well known to the person skilled in the art, and commercially available chromatography resins are conveniently used. The principles discussed above regarding the supports and immobilisation of ligands apply to this step as well. In one embodiment, the second step is a polishing step to remove the fine impurities, resulting in a highly pure product. In an alternative embodiment, the second step is an intermediate step, in which case the process according to the invention also comprises a subsequent polishing step. In an advantageous embodiment, the second step is an ion exchange chromatography step, preferably an anion exchange chromatography step. Anion exchange resins may present any positively charged ligands, such as Q groups.

In a specific embodiment, the second step of the present process involves to contact the eluate obtained from the first step with a multi-modal anion exchange resin. More specifically, a multi-modal anion exchange resin comprises anion-exchanging groups as well as one or more further group capable of providing cooperative interactions with the target antibodies. The multi-modal anion exchange resin comprises first groups, which are capable of interacting with negatively charged sites of the target compounds, and second groups, which are capable of at least one interaction other than charge-charge interaction with said target compounds. In this context, it is understood that the different modes of interaction of groups of the separation matrix are directed to the same target compound, i.e. each target compound is ideally adsorbed by two or more modes of interaction. As the skilled person in this field will appreciate, such functional groups may be present on the same ligand, in which case each ligand is multi-modal, or on different ligands, in which case the totality of the separation matrix is multi-modal. In one embodiment, the anion-exchanging groups of the multimodal anion exchange resin are strong ion-exchangers. In an alternative embodiment, the anion-exchanging groups of the multi-modal anion exchange resin are weak ion-exchangers. In a specific embodiment, the multi-modal anion exchange resin comprises aromatic groups. In another embodiment, the ligands are selected from the group that consists of N-Benzyl-N-methyl ethanolamine, N,N-dimethylbenzylamine, 2-aminobenzimidazole and thiomicamine.

The multi-modal anion exchange resin used in the present method is easily prepared by the skilled person in this field, following the discussion above as regards the support and immobilisation. Multi-modal anion-exchanging groups have been disclosed, see e.g. U.S. Pat. No. 6,702,943 (Amersham Biosciences), which is hereby included herein via reference. In the best embodiment, the second step of the present process is an anion exchange step carried out on a multi-modal anion exchange resin under non-binding conditions. Thus, in this embodiment, the eluate resulting from the first step is applied to the second chromatography resin under non-binding conditions, allowing impurities to adsorb while the antibodies are recovered from the flow-through.

The present process is useful to recover any monoclonal or polyclonal antibody, such as antibodies originating from mammalian hosts, such as mice, rodents, primates and humans, or antibodies originating from cultured cells such as hybridomas. In one embodiment, the antibodies recovered are human or humanised antibodies. The antibodies may be of any class, i.e. selected from the group that consists of IgA, IgD, IgE, IgG, and IgM. In one embodiment, the antibodies to be purified are antibodies capable of binding to Protein A, or Fc-containing antibody fragments or fusion proteins. In a specific embodiment, the antibodies recovered are immunoglobulin G (IgG). In the present context, it is to be understood that the term "antibodies" also includes antibody fragments and any fusion protein that comprises an antibody or an antibody fragment. Thus, the present invention also encompasses the purification of fragments of any one of the above mentioned antibodies as well as fusion proteins comprising such antibodies. The antibodies isolated according to the present invention are useful as drugs, such as personalised medicine which comprise an active ingredient designed for a specific individual. The antibodies isolated according to the invention are also useful in research and in the diagnostic field.

As discussed above, the multimodal ligands of the herein discussed multimodal cation exchange resin commonly comprise a cation-exchanging group i.e. a negatively charged or chargeable group and at least one aromatic or heteroaromatic ring system. However, as is easily understood by the skilled person in this field, an equivalent resin may be prepared by attaching at least two different kind of ligands to a support, wherein one kind of ligands comprise cation exchanging group(s) while another kind comprise aromatic or heteroaromatic ring system(s). Thus, the herein discussed functionalities may be coupled to the support via a single coupling group, or via different coupling groups. Thus, in one embodiment, the invention relates to a method for capture of one or more antibodies from a liquid, which process comprises contacting said liquid with a chromatography resin to adsorb the antibodies to the ligands, which resin is multimodal and comprises a support to which ligands have been immobilised, wherein the resin comprises cation-exchanging groups and aromatic or heteroaromatic ring systems present on the same or different ligands, in which systems the ring-forming atoms are selected from the group consisting of carbon (C), sulphur (S) and oxygen (O) atoms. In another embodiment, the invention relates to a process for the purification of one or more antibodies from a liquid, which process comprises contacting said liquid with a first chromatography resin to adsorb the antibodies to the ligands, which resin is multimodal and comprises a support to which ligands have been immobilised, wherein the resin comprises cation-exchanging groups and aromatic or heteroaromatic ring systems present on the same or different ligands; adding an eluent to release the antibodies from the resin; and contacting the eluate so obtained with a second chromatography resin. The discussion above also applies equally well to the multimodal anion exchange resin, in the embodiments where the second chromatography step is carried out on a multimodal anion exchange resin.

In a second aspect, the present invention is a kit comprising, in separate compartments, a multi-modal chromatography resin; a second chromatography resin; at least two different buffers; and written instructions that describe how to purify antibodies, wherein a multi-modal ligand comprises at least one cation-exchanging group and at least one aromatic or heteroaromatic ring system. In one embodiment, the ring-forming atoms of the aromatic or heteroaromatic entity are selected from the group consisting of carbon (C), sulphur (S) and oxygen (O). In an alternative embodiment, the different groups are present on different ligands, while the chromatography resin still comprises about equivalent proportions of each group and essentially all groups are available for interaction with a target. The present kit may be used for any one of the above described processes for purification of antibodies. In an advantageous embodiment, the resin is present in a column made from any conventional material, such as a biocompatible plastic, e.g. polypropylene, or glass. The column may be of a size suitable for laboratory scale or large-scale purification of antibodies. In a specific embodiment, the column is provided with luer adaptors, tubing connectors, and domed nuts. In an advantageous embodiment, the multi-modal chromatography resin is present in a chromatography column, which is of the disposable kind. By disposing of a resin after use, the risk of cross-contamination between different processes is eliminated.

Finally, the invention encompasses a disposable chromatography column for the purification of antibodies, which column comprises a multi-modal chromatography resin comprising cation-exchanging groups and aromatic and/or heteroaromatic ring systems on the same or different ligands. In one embodiment, the disposable chromatography column comprises a multi-modal chromatography resin, wherein each ligand comprises at least one cation-exchanging group and at least one aromatic or heteroaromatic ring system. In a specific embodiment of the disposable column, the ring-forming atoms of the aromatic or heteroaromatic ring system of the multi-modal ligands are selected from the group consisting of carbon (C), sulphur (S) and oxygen (O) atoms. The disposable chromatography column of the present invention may have been packed with the resin for conventional liquid chromatography, or provided with resin in a form suitable for expanded bed adsorption, i.e. a method where the resin is fluidised during operation. In the last-mentioned case, the supports that carries the ligands have been provided with some conventional high density filler, such as steel or glass.

DETAILED DESCRIPTION OF THE DRAWINGS

FIG. 1 shows a chromatogram from purification of feed containing IgG on a multi-modal cation exchange chromatography media (U1128042), as explained in example 3 below. Fractions 9 to 16 were collected and pooled for analysis by gel filtration. The recovery was determined to be >95%. The UV absorbance at 280 nm is presented as a solid line, the conductivity as a dashed line and the pH as a dotted line.

Figure 2:
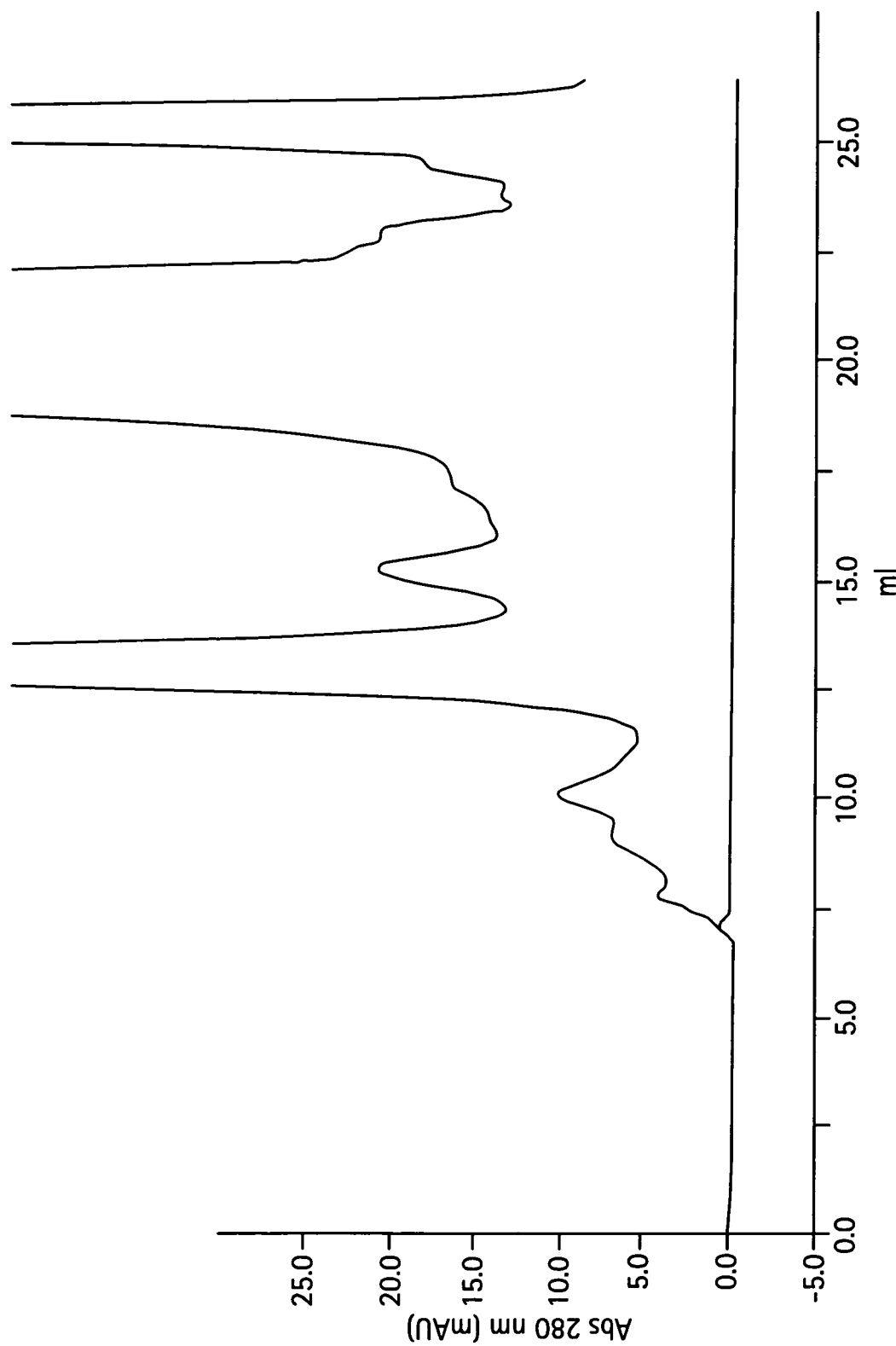
FIG. 2 shows analytical gel filtration chromatograms of the feed, as explained in example 3 below. The peak at 13 ml is the target MAb and the remaining peaks are aggregates and/or host cell proteins.

FIG. 2 shows analytical gel filtration chromatograms of the feed (start material on column U1128042), as explained in example 3 below. The sample was injected at 0 ml and the IgG peak comes at 13 ml. The peak at 13 ml is the target MAb and the remaining peaks are aggregates and/or host cell proteins.

Figure 3:
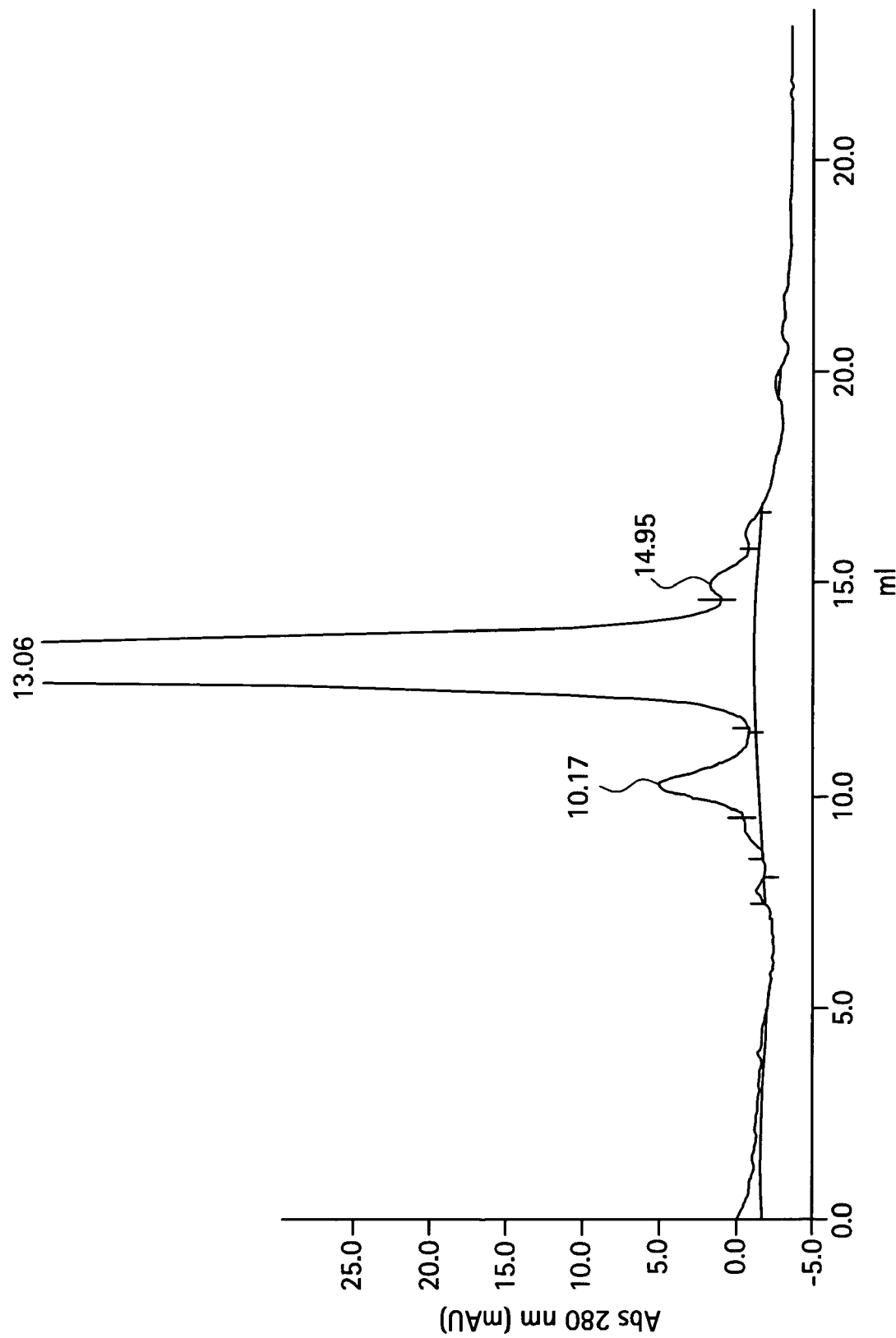
FIG. 3 shows analytical gel filtration chromatograms of the pooled fractions 9-16 eluted from U1128042, as explained in example 3.

FIG. 3 shows analytical gel filtration chromatograms of the pooled fractions 9-16 eluted from U1128042, as explained in example 3. The peak at 13 ml is the target MAb and the remaining peaks are aggregates and/or host cell proteins in the eluted sample.

Figure 4:
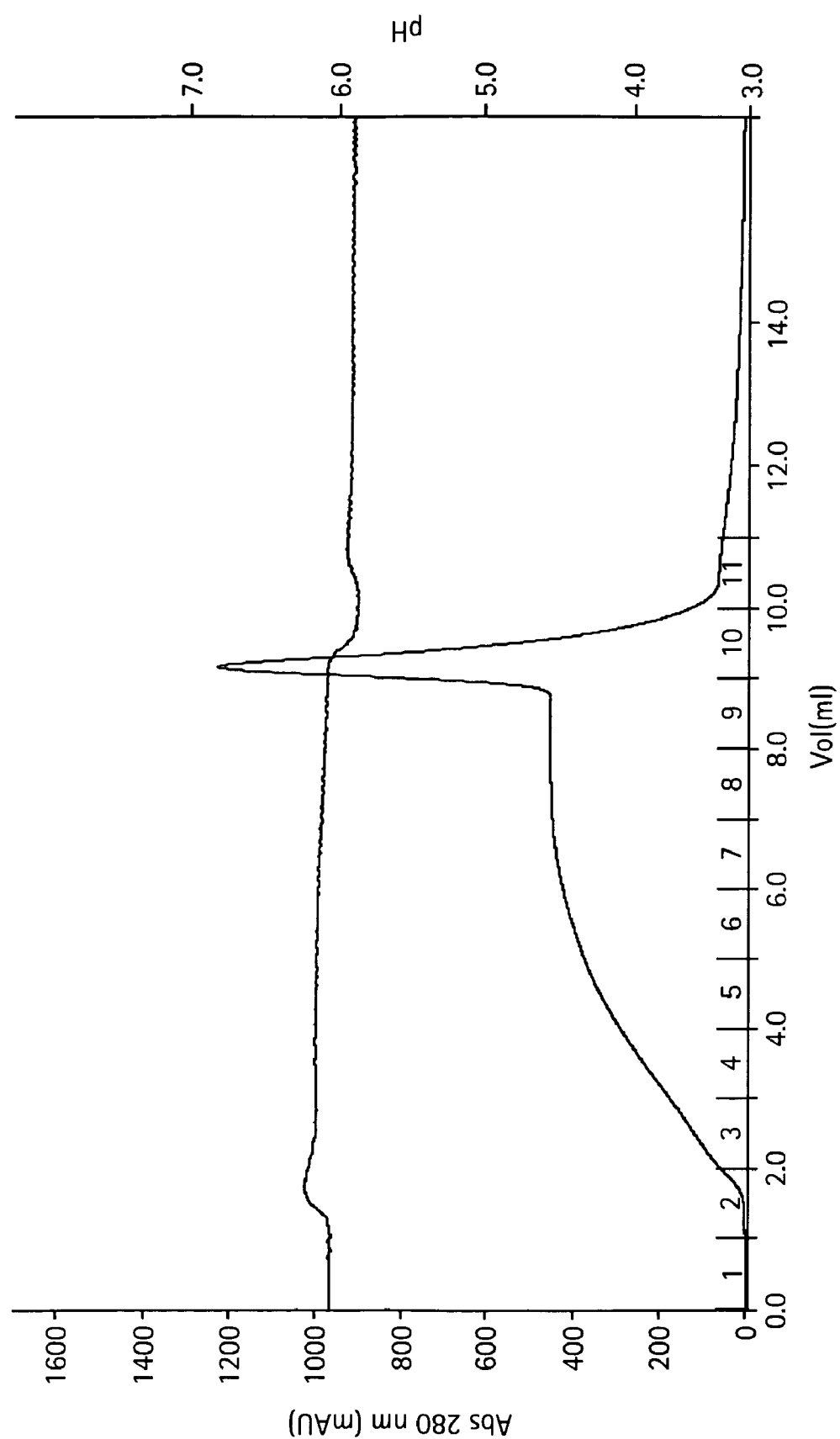
FIG. 4 shows a chromatogram from step 2 of a process according to the invention, and more specifically a polishing step using multi-modal anion exchange chromatography as explained in example 4 below.

FIG. 4 shows a chromatogram from step 2 of a process according to the invention, and more specifically a polishing step using multi-modal anion exchange chromatography as explained in example 4 below. The pooled fractions (9-16) from elution in the first purification step (example 3) was applied to the column after adjustment of the pH to 6. The IgG purity in the pooled fractions 3-10, from the flow through was estimated by analytical gel filtration to be very high (see FIG. 5). Using pH 6, the IgG was expected to end up in the flow through. However, the shape of the chromatogram indicates that some proteins bind to the column. This was also confirmed by calculation of the recovery which was 80% after this chromatographic run. The extra peak seen at the beginning of the wash with running buffer is probably loosely bound protein that comes off the column.

Figure 5:
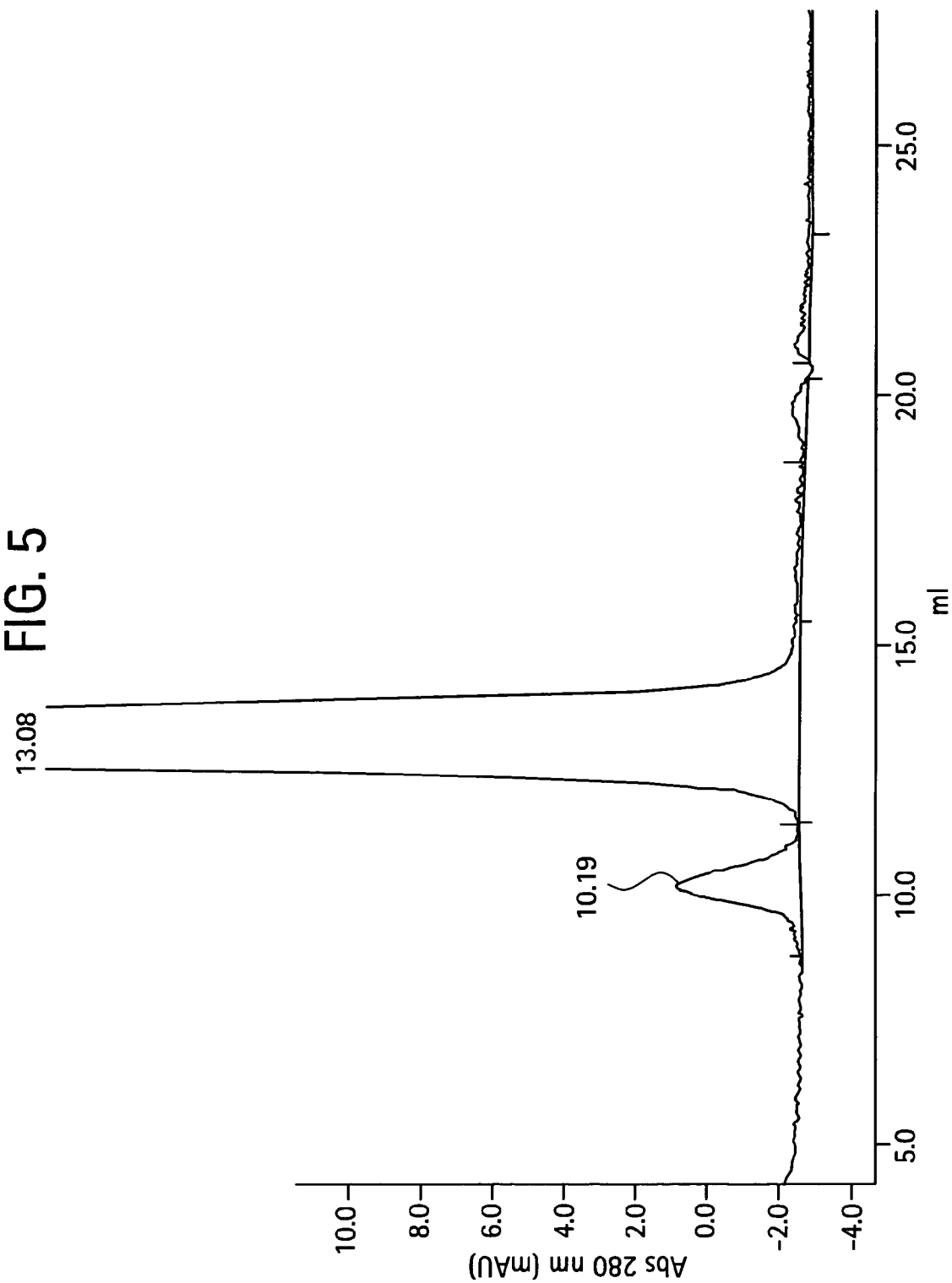
FIG. 5 shows an analytical gel filtration chromatogram of the flow through (fractions 3-10) from application on column 238092 as explained in example 4 below.

FIG. 5 shows an analytical gel filtration chromatogram of the flow through (fractions 3-10) from application on column 238092 as explained in example 4 below. The peak at 13 is IgG and the peak at 10 is aggregates. Practically no contaminating host cell proteins can be detected by this analytical method. The scale is not the same as in FIGS. 2 and 3, but is even more zoomed.

EXAMPLES

The present examples are provided for illustrative purposes only, and should not be interpreted in any way as limiting the scope of the invention as defined by the appended claims. All references provided below and elsewhere in the present specification are hereby included herein via reference.

Example 1

Preparation of Multi-modal Cation Exchange Resin (First Step)

The volumes of matrix given below refer to settled bed volume. The weights of matrix given in gram refer to suction (water pump) dry weight. It is understood that these matrices are still water solvated material. The stirring referred to below was by a suspended, motor-driven stirrer, since the use of magnet bar stirrer is prompt to damage the beads. The analysis of the functionality and the determination of the degree of allylation, epoxidation, or the degree of substitution of ion exchanger groups on the beads refer to conventional methods which are well known to the skilled person in this field. The methods below were eventually complemented by additional elementary analysis of the gels in particular for sulphur atom.

TABLE 1

Chemical structures of multi-modal ligand prototypes

| Ligand structure | Prototype no. |
|---|---|
| (structure) | U1012054 |
| (structure) | U790P73 |
| (structure) | U790P65 |
| (structure) | U790P71 |

Example 1(a)

Multi-modal Ligand Prototype U1012054

In this example, it is described how 3-amino-4(propylsulfonyl)thiophene-2-carboxylic acid was coupled to an NHS-activated agarose carrier.

Preparation of Thiopropionic Acid Sepharose™: Bromine was added to a stirred suspension of 100 ml of allyl activated (0.3 mmol allyl/ml) Sepharose™ 6 Fast Flow gel (Amersham Biosciences, Uppsala, Sweden), 4 g of AcONa and 100 ml of distilled water, till a persistent yellow colour was obtained. Sodium formate was then added till the suspension was fully decolourised. The reaction mixture was filtered and the gel washed with 500 ml of distilled water. The activated gel was then directly transfer to a reaction vessel and treated with an aqueous solution (50 ml dist.water) of 17.5 ml of thiopropionic acid (6 equivalents per allyl group) and 12 g of NaCl which pH was adjusted to 11.5 with 50% aq. NaOH before the addition. The reaction was left for 18 hours under stirring at 50° C. Filtration of the reaction mixture and washing with 500 ml of distilled water resulted in the thiopropionic Sepharose™ gel with a degree of substitution 0.29 mmol $CO_2H$ group/ml of gel.

Activation of Gel with N-hydroxysuccinimide: 100 ml of the resulting thiopropionic acid Sepharose™ was then washed successively with 300 ml 1 M NaCl, 500 ml 0.1 M HCl, 500 ml 50% aq. acetone, 500 ml acetone. After the washings the gel was left to settle in acetone, the supernatant siphoned off and the settled beads transferred to a reaction vessel with help of 20 ml of acetone. A solution of 15.2 g of N-hydroxysuccinimide (NHS) in 80 ml of acetone and another solution of dicyclohexylcarbodiimide in 80 ml of acetone were then both added. The reaction slurry was left under stirring at 30° C. for 18 hours. After filtration, the gel was slowly washed (gravity flow) with 10 times 150 ml isopropanol over a full working day. The degree of NHS-activation was estimated after reaction with $NH_4OH$ to be about 80%, corresponding to an activation of about 0.23 mmol of NHS function/ml of gel.

Coupling of Multi-Modal Ligand to NHS-activated Thiopropionic Acid Sepharose™: 3-amino-4(propylsulfonyl)thiophene-2-carboxylic acid was prepared as described in WO 02/05959 (ligand 12). A soluble mixture of a solution of 565 mg of 3-amino-4(propylsulfonyl)thiophene-2-carboxylic acid (2.27 mmol) in 2 ml of dist. water, 2 ml of 1M $NaHCO_3$ and 2 ml of ethanol was prepared and adjusted to pH 8.5 with careful addition of 50% aqueous NaOH. NHS-activated thiopropionic acid Sepharose™ (10 ml) was quickly washed with 20 ml ice cold 1 mM HCl solution. The gel was then transferred to an Erlenmeyer to which the thineyl serine solution was added. The reaction mixture was left on a shaking table (150 rpm) at room temperature for 18 hours. After filtration of the reaction mixture, the gel was washed successively, with 40 ml distilled water, 20 ml ethanol, 20 ml 0.25 M aq.ethanolamine, 20 ml distilled water, 20 ml 1M aq. NaCl, and 20 ml of distilled water.

Examples 1(b)-(d)

In examples 1(b)-(d) below, the multi-modal ligand prototypes U790P65, U790P71 and U790P73 were prepared using D,L-homocysteine thiolactone as a scaffold, as described in WO 03/024588. In brief, after formation of the amide bound by reacting homocysteine thiolactone with acyl chlorides or anhydrides, the opening of the thiolactone ring was realised with basic hydrolysis and the resulting compound further coupled to an activated Sepharose™ 6FF (Amersham Biosciences, Uppsala, Sweden).

Example 1(b)

Multi-Modal Ligand Prototype U790P73

A solution of benzoyl chloride (8.7 ml, 75 mmol) in 30 ml DCM was added drop wise to a solution of D,L-homocysteine thiolactone (11.5 g, 75 mmol) and di-isopropylamine (DIPEA) (26 ml, 150 mmol) in dichloromethane (DCM, 120 ml) at 0° C. The mixture was stirred overnight at room temperature. The solvent was evaporated under vacuum and the reaction residue was extracted with ethyl acetate (300 ml). The organic phase was washed with aq. citric acid 10% (w/w, 200 ml), aq. $K_2CO_3$ 10%(200 ml), water (200 ml), and dried with sodium sulphate. After filtration, the solvent was removed yielding a white solid (13.8 g, 83%). At 0° C., a 5N sodium hydroxide solution (5 ml) was added to 276 mg (1.25 mmol) of the white solid and the mixture was further stirred for 2 hours at room temperature. Brominated Sepharose™ 6 Fast Flow (10 ml) (Amersham Biosciences, Uppsala, Sweden), obtained following a well known procedure starting from an allylated Sepharose™ 6 Fast Flow (250 µmol/ml), was mixed with the alkaline solution of the ligand (described above) and warmed up to 50° C. overnight. After reaction, the gel was filtered and washed with water (2×150 ml), ethanol (2×150 ml), acetic acid 0.2M (2×150 ml) and water (2×150 ml). The ionic capacity of the gel was then measured by titration of the acid groups and gave 103 µmol/ml of gel.

Example 1(c)

Multi-modal Ligand Prototype U790P65

A solution of 3,4,5-trimethoxy-benzoyl chloride (2.37 g, 10.3 mmol) in 4 ml DCM was added drop wise to a solution of D,L-homocysteine thiolactone (1.58 g, 10.3 mmol) and di-isopropylamine (DIPEA) (3.58 ml, 20.6 mmol) in dichloromethane (DCM, 6 ml) at 0° C. The mixture was stirred overnight at room temperature. The solvent was evaporated under vacuum and the reaction residue was extracted with ethyl acetate (50 ml). The organic phase was washed with aq. citric acid 10% (w/w, 30 ml), aq. $K_2CO_3$ 10% (30 ml), water (30 ml), and dried with sodium sulphate. After filtration, the solvent was removed yielding a white solid (2.21 g, 69%). At 0° C., a 5N sodium hydroxide solution (5 ml) was added to 389 mg (1.25 mmol) of the white solid and the mixture was further stirred for 2 hours at room temperature. Brominated Sepharose™ 6 Fast Flow (10 ml) (Amersham Biosciences, Uppsala, Sweden), obtained following a well known procedure starting from an allylated Sepharose™ 6 fast Flow (250 µmol/ml), was mixed with the alkaline solution of the ligand (described above) and warmed up to 50° C. overnight. After reaction, the gel was filtered and washed with water (2×150 ml), ethanol (2×150 ml), acetic acid 0.2M (2×150 ml) and water (2×150 ml). The ionic capacity of the gel was then measured to be 59 µmol/ml of gel.

Example 1(d)

Multi-modal Ligand Prototype U790P71

A solution of phenyl glutaric anhydride (1.96 g, 10.3 mmol) in 4 ml DCM was added drop wise to a solution of D,L-homocysteine thiolactone (1.58 g, 10.3 mmol) and di-isopropylamine (DIPEA) (3.58 ml, 20.6 mmol) in dichloromethane (DCM, 6 ml) at 0° C. The mixture was stirred overnight at room temperature. The solvent was evaporated under vacuum and the reaction residue was directly treated with a 5N sodium hydroxide solution (10 ml) and further stirred for 2 hours at room temperature. Brominated Sepharose™ 6 Fast Flow (10 ml) (Amersham Biosciences, Uppsala, Sweden), obtained following a well known procedure starting from an allylated Sepharose™ 6 Fast Flow (250 µmol/ml), was mixed with 1.4 ml of the alkaline solution of the ligand described above and warmed up to 50° C. overnight. After reaction, the gel was filtered and washed with water (2×150 ml), ethanol (2×150 ml), acetic acid 0.2M (2×150 ml) and water (2×150 ml). The ionic capacity of the gels was then measured to be 110 µmol/ml of gel corresponding to a ligand substitution level of 55 µmol/ml of gel.

Example 2

Preparation of Multi-modal Anion Exchange Resin (Second Step)

General

Volumes of matrix refer to settled bed volume.

Weights of matrix given in gram refer to suction dry weight. It is understood that these matrices are still water solvated material.

For large scale reaction stirring is referring to a suspended, motor-driven stirrer since the use of magnet bar stirrer is prompt to damage the beads. Small scale reactions (up to 20 ml or g of gel) were performed in closed vials and stirring refer to the use of a shaking table.

Analysis of the functionality and the determination of the degree of allylation, epoxidation, or the degree of substitution of ion exchanger groups on the beads refer to conventional methods.

1. Introduction of Allyl Group on the Matrix

In the typical procedure allylation was carried out with allyl glycidyl ether, but note that the introduction of allyl groups on the solid support can as well be easily achieved with using allyl bromide.

Activation of Sepharose™ with Allyl Glycidyl Ether

A 100 g quantity of Sepharose™ 6 FF was suction dried to 80 g, mixed with 0.4 g of NaBH$_4$, 12 g of Na$_2$SO$_4$ and 45 ml of 50% aqueous solution of NaOH. The mixture was stirred for 1 hour at 50° C. After addition of 100 ml of allylglycidyl ether the suspension was left at 50° C. under vigorous stirring for an additional 20 hours. After filtration of the mixture, the gel was washed successively, with 500 ml distilled water, 500 ml ethanol, 200 ml distilled water 200 ml 0.2 M acetic acid and, 500 ml distilled water.

Titration gave a degree of substitution of 0.32 mmol of allyl/ml of gel.

2. Coupling of Ligand on the Matrix

Coupling to the matrix was realised in preference via bromination of the allyl group and nucleophilic substitution under basic conditions.

Activation of Allyl Sepharose™ via Bromination:

Bromine was added to a stirred suspension of 100 ml of allyl activated Sepharose™ 6 FF (0.32 mmol allyl groups/ml drained gel), 4 g of AcONa and 100 ml of distilled water, until a persistent yellow colour was obtained. Sodium formate was then added till the suspension was fully decolourised.

The reaction mixture was filtered and the gel washed with 500 ml of distilled water. The activated gel was then directly transferred to a reaction vessel and further reacted with the appropriate multi-modal anion exchange ligand.

2-aminobenzimidazole—Sepharose™

A 10 g quantity of bromine activated gel (0.32 mmol allyl groups/ml drained gel) obtained as described above was transferred to a reaction vial containing a solution of 2-aminobenzimidazole (2 g) in water (6 ml) and ethanol (3 ml) that has been adjusted to pH 12 by addition of a 50% aqueous solution of NaOH The reaction was left 17 hours under stirring at 55° C. After filtration of the reaction mixture the gel was successively washed with 3×10 ml of distilled water, 3×10 ml aqueous 0.5 HCl and finally 3×10 ml of distilled water. 2-aminobenzimidazo Sepharose™ gel was obtained with a degree of substitution 0.17 mmol amine group/ml of gel.

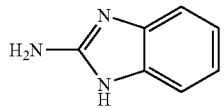

2-aminobenzimidazole

Example 3

Capture of Antibodies to Multi-modal Cation Exchanger

Materials and Method

In a chromatographic column, Tricorn™ 5/50, a prototype resin comprising the ligand U790P73 (N-(2-oxo-tetrahydro-thiophen-3-yl)-benzamide), prepared as described in example 1 above, was coupled to Sepharose™ 6 FF to a substitution level of 40 μmol/ml gel, was packed to a column volume of 1 ml.

The starting material was a Chinese Hamster Ovary (CHO) cell clarified feed prepared according to standard methods. The feed contained humanized IgG1, which was basic and presented a pI value of 9.1 and an extinction coefficient ($\epsilon$) of 1.7, to a concentration of 0.8 g mAb/L.

The pH in the feed was adjusted to 6 by addition of concentrated acetic acid before 25 ml of feed was loaded onto the multi-modal cation exchange column. 50 mM phosphate buffer, pH 6 was used as loading buffer and the flow velocity during loading was 100 cm/h. After a wash period of 14 column volumes the bound protein was eluted by a pH step, using 25 mM phosphate buffer, pH 7.5. The flow through fraction and 2 ml fractions from wash and elution were collected.

Analytical Gel Filtration

Analytical gel filtration was performed to get an estimate of the purity of eluted fractions. The start material as well as flow through and pooled eluate from the chromatographic run were analysed. 50 μl of sample was applied to a Superdex™ 200 10/300 GL column using 10 mM phosphate buffer, 0.14 M NaCl, pH 7.4 as running buffer and a flow rate of 0.5 ml/min.

Analysis of Protein Concentration in the Pooled Eluate for Determination of Recovery The total pool from elution was diluted five times in elution buffer. The absorbance at 280 nm was measured in a spectrophotometer and the average of the three replicate absorbances was used for determination of the protein concentration according to Formula 1. The total amount of eluted protein was calculated and divided by the total amount of IgG applied to the column for calculation of the recovery.

$$C = A * \text{ dilution factor}/(l \times \epsilon) \quad \text{Formula 1:}$$

wherein
C=concentration of IgG (mg/ml)
A=absorbance at 280 nm
l=path length (cm)
$\epsilon$=molar extinction coefficient for the MAb (mg ml$^{-1}$)

Results

The IgG was bound to the column using a binding buffer of pH 6 and could be eluted using pH 7.5. The pooled fractions (9-16) from elution contained IgG to a high purity compared to the IgG purity of the start material. Very little of the target protein (<5%) was found in the flow through, and the recovery was estimated to be >95%. The chromatogram from the purification on the multi-modal cation exchanger can be seen in FIG. 1 and the chromatograms from the analytical gel filtration on the start material (feed), and the pooled eluate from the capture step, are shown in FIGS. 2 and 3.

More specifically, first, the CHO cell clarified feed was loaded on a multi-modal cation exchange chromatography media (U1128042) after adjustment of the pH in the feed to 6.50 mM of phosphate, 20 mM of Na-Succinate, pH 6 was used as binding buffer and the bound protein was eluted using a pH step. 25 mM phosphate buffer, pH 7.5 was used for elution. Fractions 9 to 16 were collected and pooled for analyse by gel filtration. The recovery was determined to be >95%. In FIG. 1, the UV absorbance at 280 nm is presented as a solid line, the conductivity as a dashed line and the pH as a dotted line.

For the analytical gel filtration chromatograms of the feed (start material on column U1128042), the sample volume was 50 μl and the eluent was PBS buffer, pH 7.4 at a flow rate of 0.5 ml/min. The sample was injected at 0 ml and the IgG peak comes at 13 ml. In FIG. 2, the peak at 10 ml is IgG aggregates and the remaining peaks are host cell proteins.

The analytical gel filtration chromatograms of the pooled fractions 9-16 eluted from U1128042 are presented in FIG. 3. After the first chromatography step the contaminating proteins were reduced to a great extent. The sample was injected at 0 ml, the peak at 13 ml is the IgG and the peak at 10 ml is IgG aggregates. The other peaks are host cell proteins in the eluted sample.

Example 4

Polishing by Anion Exchange

Materials and Method

A media (238092) comprised of the ligand 2-Aminobenzimidazole coupled to Sepharose™ 6 FF to a substitution level of 170 μmol/ml gel, was packed in a chromatographic column, HR 5/5, to a column volume of 1 ml.

The pooled eluate, fractions 9-16, from example 2 was used as a starting material in this purification step. The pH in the eluate was adjusted to 6 by addition of 10% acetic acid. 8 ml of the pH adjusted eluate, corresponding to approximately 10 mg of IgG, was applied to the column 238092 using 25 mM phosphate, pH 6 as loading buffer. The buffer conditions, pH and conductivity, were chosen to be non-binding conditions for the IgG. A flow rate of 0.5 m/min was used and 1 ml fractions were collected during sample application and wash.

The IgG purity of pooled fractions (3-10) from the flow through were analysed by analytical gel filtration. The amount of eluted protein was determined, and the recovery was calculated. The method for analytical gel filtration and the determination of protein concentration and calculation of recovery are described in materials and method in example 2.

Results

The eluted IgG fractions from purification in a capture step, using multi-modal cation exchange chromatography was further purified by anion exchange chromatography. In this polishing step, the IgG was loaded onto the column using non-binding conditions. The IgG purity in the pooled fractions from flow through in this polishing step was estimated by analytical gel filtration to be very high. Some of the IgG bound to the column although non-binding conditions were used, and the recovery was calculated to be 80%.

The chromatogram from the purification on the multi-modal anion exchanger can be seen in FIG. 4, and the chromatogram from the analytical gel filtration on the flow through fractions is shown in FIG. 5.

To obtain FIG. 4, the pooled fractions (9-16) from elution in the first purification step (example 3) was applied to the column after adjustment of the pH to 6. The IgG purity in the pooled fractions 3-10, from the flow through was estimated by analytical gel filtration to be very high (see FIG. 5). Using pH 6, the IgG was expected to end up in the flow through. However, the shape of the chromatogram indicates that some proteins bind to the column. This was also confirmed by calculation of the recovery which was 80% after this chromatographic run. The extra peak seen at the beginning of the wash with running buffer is probably loosely bound protein that comes off the column.

To obtain FIG. 5, the analytical gel filtration chromatogram of the flow through (fractions 3-10) from application on column 238092, the peak at 13 is IgG and the peak at 10 is aggregates. Practically no contaminating host cell proteins can be detected by this analytical method. The scale is not the same as in FIGS. 2 and 3 but is even more zoomed.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A process for the purification of one or more antibodies from a liquid, comprising:
    contacting said liquid in a first step, which is a capture step, with a first chromatography resin including a support to which multi-modal ligands have been immobilised to adsorb the antibodies to the resin, wherein each multi-modal ligand includes at least one cation-exchanging group and at least one aromatic or heteroaromatic ring system;
    adding an eluent to release the antibodies from the resin; and
    contacting the eluate so obtained with a second chromatography resin;
    wherein the liquid contacted with the first chromatography resin is a cell culture liquid or a fermentation broth and host cell residues are removed in the first step.

2. The process of claim 1, wherein the cation-exchanging group of the multi-modal ligands is a weak cation exchanger.

3. The process of claim 1, wherein the second chromatography resin is selected from the group consisting of ion exchange chromatography; hydrophobic interaction chromatography (HIC); immobilised metal affinity chromatography (IMAC); and affinity chromatography.

4. The process of claim 3, wherein the second chromatography resin is ion exchange chromatography.

5. The process of claim 1, wherein the second chromatography resin is anion exchange chromatography.

6. The process of claim 1, wherein the second chromatography resin is multimodal anion exchange chromatography.

7. The process of claim 1, wherein antibodies are recovered from the flow-through of the second chromatography resin.

8. The process of claim 1, wherein antibodies and/or impurities are eluted from the second chromatography resin.

9. The process of claim 1, wherein the antibodies are monoclonal antibodies.

10. The process of claim 1, wherein the antibodies are polyclonal antibodies.

11. A process for the purification of one or more antibodies from a liquid, comprising:

contacting said liquid in a first step, which is a capture step, with a first chromatography resin to adsorb the antibodies to ligands, which resin is multimodal and comprises a support to which the ligands have been immobilised, wherein the resin includes cation-exchanging groups and aromatic or heteroaromatic ring systems present on different ligands;

adding an eluent to release the antibodies from the resin; and contacting the eluate so obtained with a second chromatography resin;

wherein the liquid contacted with the first chromatography resin is a cell culture liquid or a fermentation broth and host cell residues are removed in the first step.

* * * * *